(12) United States Patent
Sadiku et al.

(10) Patent No.: US 11,303,176 B2
(45) Date of Patent: Apr. 12, 2022

(54) COIL WINDING FOR STATORS OR ROTORS

(71) Applicant: Schaeffler ELMOTEC STATOMAT GmbH, Karben (DE)

(72) Inventors: Sadik Sadiku, Neuberg (DE); Keith Witwer, Fort Wayne, IN (US)

(73) Assignee: Schaeffler ELMOTEC STATOMAT GmbH, Karben (DE)

( * ) Notice: Subject to any disclaimer, the term of this patent is extended or adjusted under 35 U.S.C. 154(b) by 326 days.

(21) Appl. No.: 16/339,412

(22) PCT Filed: Oct. 2, 2017

(86) PCT No.: PCT/EP2017/075004
§ 371 (c)(1),
(2) Date: Apr. 4, 2019

(87) PCT Pub. No.: WO2018/065375
PCT Pub. Date: Apr. 12, 2018

(65) Prior Publication Data
US 2019/0238019 A1    Aug. 1, 2019

(30) Foreign Application Priority Data
Oct. 5, 2016   (DE) ..................... 10 2016 118 871.9

(51) Int. Cl.
*H02K 3/28* (2006.01)
*H02K 3/12* (2006.01)
(52) U.S. Cl.
CPC ................ *H02K 3/28* (2013.01); *H02K 3/12* (2013.01)

(58) Field of Classification Search
CPC .. H02K 3/28; H02K 3/12; H02K 1/16; H02K 1/26; H02K 3/04; H02K 3/505;
(Continued)

(56) References Cited

U.S. PATENT DOCUMENTS

| 2013/0154428 A1 | 6/2013 | Sakuma et al. |
| 2015/0028714 A1 | 1/2015 | Matsuoka et al. |

(Continued)

OTHER PUBLICATIONS

International Search Report and Written Opinion dated Dec. 8, 2017 from the International Searching Authority Re. Application No. PCT/EP2017/075004.

(Continued)

*Primary Examiner* — Ahmed Elnakib

(57) ABSTRACT

A coil winding (20) that consists of a number of wires (22) braided with one another and bent multiple times in opposite directions such that mutually parallel legs (28, 30) of the wires (22) which are intended to fill the slots (16) are connected by winding overhangs (32, 34) which project from the end face of the stators (10) or rotors. The winding overhangs (32, 34) each have two oblique winding overhang sections (36, 38, 40, 42) having a winding overhang tip (44, 46) in between. The wires (22) are arranged one behind the other in a longitudinal direction (L) of the coil winding (20). The winding overhangs (32, 34), which are distributed in the longitudinal direction (L) over the entire length of the coil winding, of at least one wire (22) protrude transversely to the longitudinal direction (L) beyond the winding overhang (28, 30).

16 Claims, 7 Drawing Sheets

(58) Field of Classification Search
CPC ........ H02K 17/20; H02K 17/205; H02K 3/00; H02K 3/32; H02K 3/18
USPC .................................................. 310/179–210
See application file for complete search history.

(56) References Cited

U.S. PATENT DOCUMENTS

2015/0054374 A1    2/2015  Neet
2015/0076953 A1*   3/2015  Tamura .................... H02K 3/28
                                                  310/208

OTHER PUBLICATIONS

Notification of Office Action and Search Report dated Jun. 17, 2021 From the China Intellectual Property Administration Re. Application No. 201780061938.6 and Its Translation Into English. (21 Pages).

* cited by examiner

Fig. 7

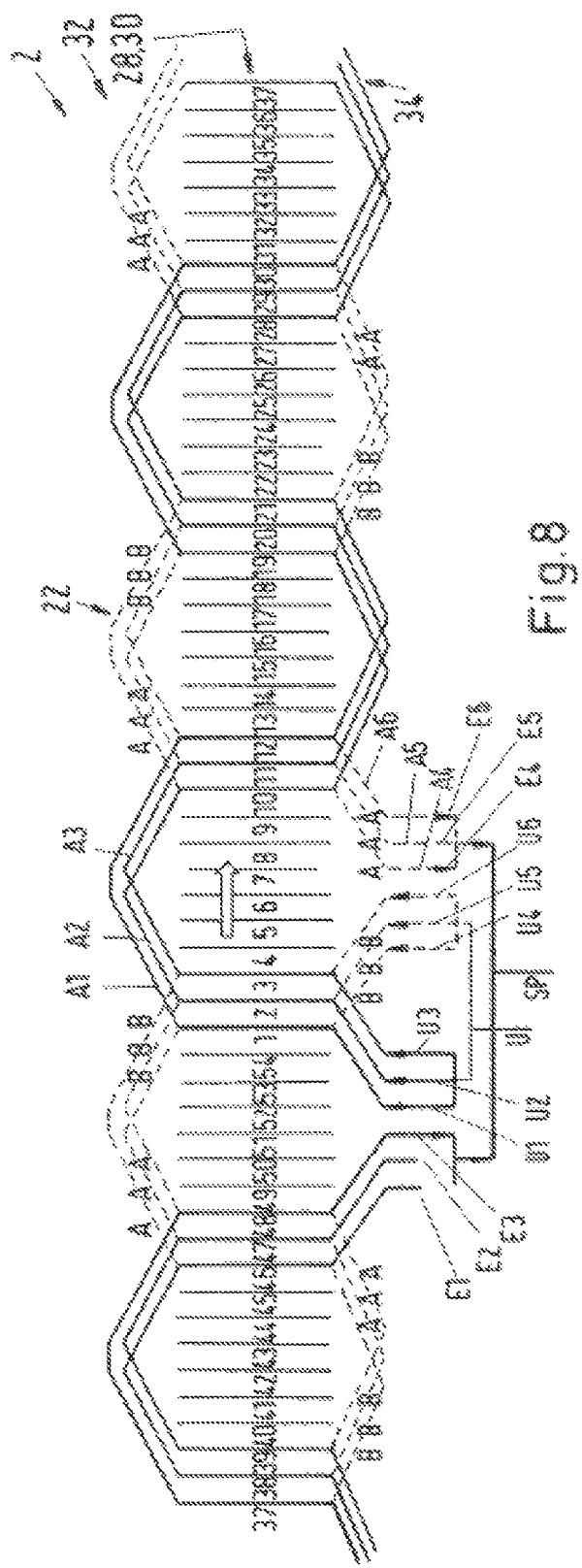

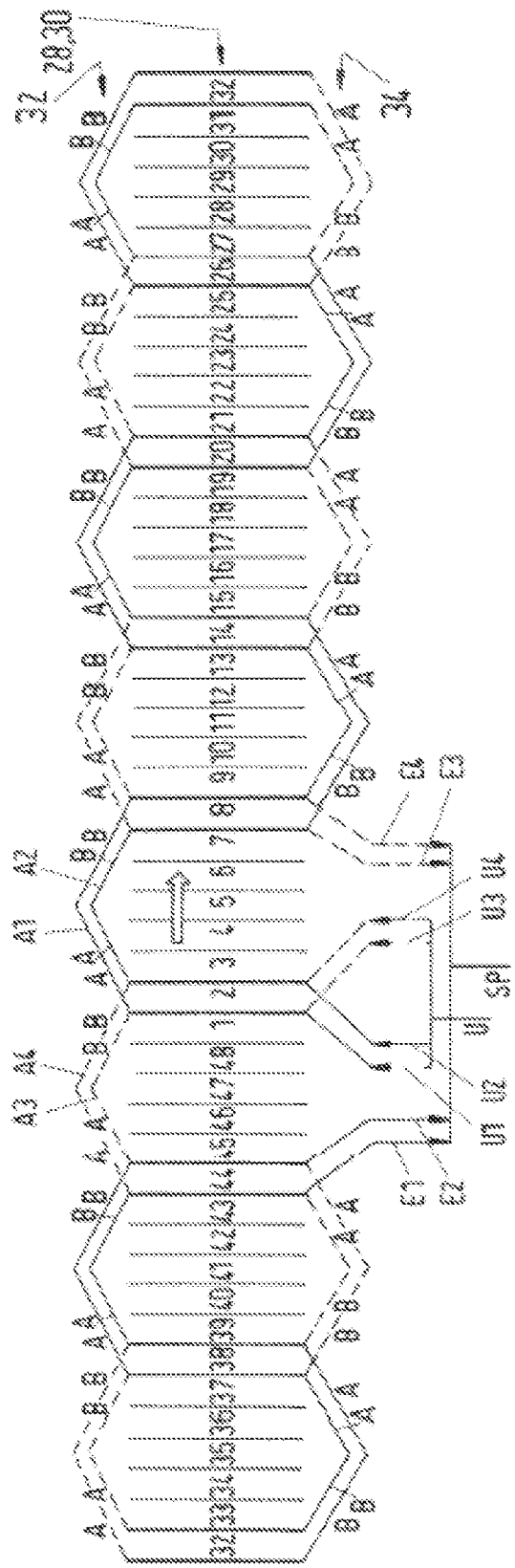

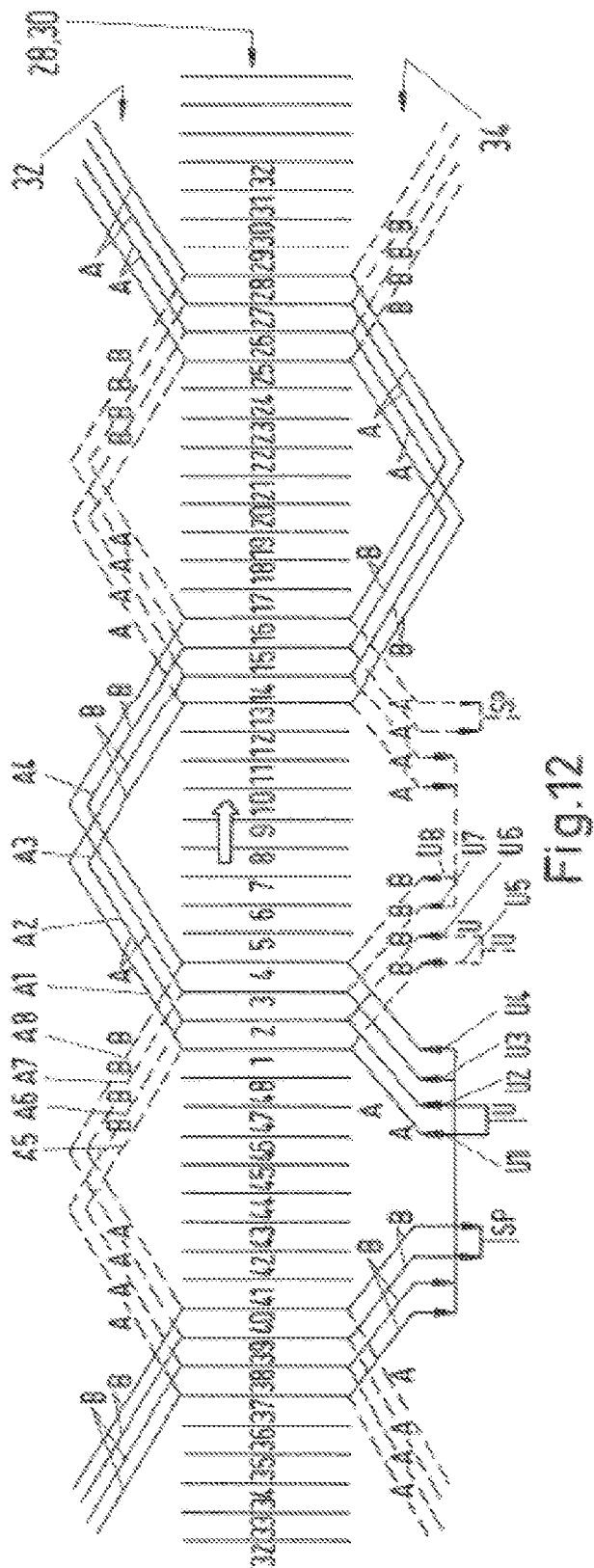

COIL WINDING FOR STATORS OR ROTORS

RELATED APPLICATIONS

This application is a National Phase of PCT Patent Application No. PCT/EP2017/075004 having International filing date of Oct. 2, 2017, which claims the benefit of priority of German Patent Application No. 10 2016 118 871.9 filed on Oct. 5, 2016. The contents of the above applications are all incorporated by reference as if fully set forth herein in their entirety.

FIELD AND BACKGROUND OF THE INVENTION

The invention relates to a coil winding for insertion into radially open slots of stators or rotors of electrical machines, wherein the coil winding consists of a number of wires which are braided with one another and are bent several times in opposite directions such that limbs, which lie parallel in relation to one another, of the wires, which are intended to fill the slots, are connected by winding overhangs which project beyond the end sides of the rotors or stators, wherein the winding overhangs each have two obliquely running winding overhang sections with a winding overhang tip lying in between, and wherein the wires are arranged one behind the other in a longitudinal direction of the coil winding. The invention further relates a stator or rotor comprising a coil winding of this kind.

Rotors or stators for electric motors have a substantially cylindrical or hollow-cylindrical main body with radial slots which are arranged in a manner distributed uniformly over the circumference and extend in the axial direction over the entire main body and into which a coil winding comprising a plurality of wires, which are associated with different phases, is inserted.

The coil winding extends substantially in a longitudinal direction which corresponds to the circumferential direction of the stator. The wires are each bent several times in opposite directions, so that each wire has a plurality of limbs which lie parallel in relation to one another and one behind the other in the longitudinal direction. The limbs are respectively connected by roof-like winding overhangs, so that the wires have a substantially wave-like or zigzag-like profile in the longitudinal direction. The parallel limbs are respectively intended to be inserted into the slots. The winding overhangs each project beyond the end side of the main body.

The wires are arranged one behind the other in a longitudinal direction which corresponds to the circumferential direction of the stator or rotor, wherein the individual wires, in the region of the limbs, can overlap in a direction which runs transverse to the longitudinal direction and also transverse to the direction of extent of the parallel limbs. As a result, the limbs alternate between an inner and an adjacent outer radial position in the stator in the state in which said limbs are inserted into the slots. These wires are associated with a plurality of phases, wherein adjacent wire groups can each be formed with a plurality of wires which each have one phase. Only wires of in each case one phase are preferably arranged in a slot.

The degree of efficiency of the stator, and therefore of the electric motor, depends, amongst other things, on the arrangement of the wires in the stator, that is to say on the type of coil winding. Firstly, a coil winding which is as tight as possible is desired. Secondly, it is desirable to prevent the wires from touching or to prevent wires with different phases negatively influencing one another.

It is known, in principle, from the prior art for wires to occasionally have a higher winding overhang, so that, between two limbs which follow one another in the longitudinal direction, said wires can each jump over a wire which lies in front of it in the longitudinal direction, so that the order of the wires in the region of the limbs changes in a following section. In order to achieve larger jumps, for example in order to jump over two or more wires, it is necessary for the height of the winding overhangs to correspondingly increase, as a result of which the overall height of the stator or of the rotor increases.

SUMMARY OF THE INVENTION

The object of the invention is to provide a coil winding which allows the order of the wires to be changed in any desired manner with a low overall height of the rotor or of the stator. The object of the invention is further to provide a coil winding which allows an improved degree of efficiency of a stator or rotor with the same dimensions. A further aim is to provide a stator or rotor comprising a coil winding of this kind, which stator or rotor has as high a degree of efficiency as possible with a low overall height.

The main features of the invention are specified in the characterizing parts of claims 1 and 14. Refinements are the subject matter of claims 2 to 13 and 15 and 16.

In order to achieve the object, a coil winding for insertion into radially open slots of stators or rotors of electrical machines is provided, wherein the coil winding consists of a number of wires which are braided with one another and are bent several times in opposite directions such that limbs, which lie parallel in relation to one another, of the wires, which are intended to fill the slots, are connected by winding overhangs which project beyond the end sides of the rotors or stators, wherein the winding overhangs each have two obliquely running winding overhang sections with a winding overhang tip lying in between, wherein the wires are arranged one behind the other in a longitudinal direction of the coil winding. In a manner distributed over the entire length of the coil winding in the longitudinal direction, winding overhangs of at least one wire protrude transversely in relation to the longitudinal direction beyond the winding overhang of at least one wire which follows in the longitudinal direction such that the wire, in a region of the limbs which follows the winding overhang, lies at least in front of the at least one wire which first follows in front of the winding overhang. Therefore, there are changes in the order of the wires over the entire length of the coil winding. The changes preferably take place such that the immediately adjacent wires or the wires which lie in a slot of the stator or rotor do not negatively influence one another.

Each wire preferably has at least one winding overhang which protrudes transversely in relation to the longitudinal direction beyond the winding overhang of at least one wire which follows in the longitudinal direction such that the wire, in the region of the limbs which follows the winding overhang, lies at least in front of the at least one wire which first follows in front of the winding overhang.

The winding overhangs, which protrude transversely in relation to the longitudinal direction beyond the winding overhang of at least one wire which follows in the longitudinal direction such that the wire, in the region of the limbs which follows the winding overhang, lies at least in front of the at least one wire which first follows in front of the winding overhang, are preferably arranged in a manner distributed uniformly along a wire and/or along the coil winding, so that a uniform distribution of the changes in the order of the wires is produced.

The winding overhangs, which protrude transversely in relation to the longitudinal direction beyond the winding overhang of at least one wire which follows in the longitudinal direction such that the wire, in the region of the limbs which follows the winding overhang, lies at least in front of the at least one wire which first follows in front of the winding overhang, can have a connecting section which extends substantially in the longitudinal direction and/or is arranged parallel in relation to the longitudinal direction, wherein the connecting sections lie, in particular, in a plane which is arranged parallel in relation to the longitudinal direction. With a connecting section of this kind, it is possible to jump over any desired number of wires, wherein the overall height of the stator or of the rotor is independent of the jump width, that is to say the number of jumped-over wires. The wires can therefore jump over any desired number of other wires, so that it is possible to freely change the order of the wires. The order of the wires, in particular of the limbs, can therefore be adapted such that as high a degree of efficiency of a stator as possible can be achieved with a coil winding of this type by way of the wires of the individual phases being arranged such that they do not negatively influence one another.

Each of the wires has at least one connecting section, so that the order of the wires in the region of the limbs is regularly changed. Regular jumps of the individual wires are preferably provided, that is to say the order of the wires in the region of the limbs is changed in accordance with a regular repetitive pattern, so that the connecting sections are uniformly distributed. In this case, the jumps of the wires are selected such that the individual connecting sections do not intersect or make contact. The distribution of the jumps and the number of wires which are jumped over with one connecting section are preferably selected, for example, depending on the number of wires, the number of slots or the number and distribution of the phases, such that the stator or the rotor has as high a degree of efficiency as possible.

The winding overhang tips of the winding overhangs, which protrude transversely in relation to the longitudinal direction beyond the winding overhang of at least one wire which follows in the longitudinal direction such that the wire, in the region of the limbs which follows the winding overhang, lies at least in front of the at least one wire which first follows in front of the winding overhang, preferably lie in a plane which is arranged parallel in relation to the longitudinal direction, and the other winding overhangs are located in a plane which is at a distance from said plane. The distance of the plane of the winding overhang tips of the winding overhangs, which protrude transversely in relation to the longitudinal direction beyond the winding overhang of at least one wire which follows in the longitudinal direction such that the wire, in the region of the limbs which follows the winding overhang, lies at least in front of the at least one wire which first follows in front of the winding overhang, from the limbs is greater than the distance of the plane of the other winding overhang tips from the limbs.

The wires preferably have a plurality of sections each comprising a downwardly directed limb, a lower winding overhang, an upwardly directed limb and an upper winding overhang. The winding overhang tips of the winding overhangs, which protrude transversely in relation to the longitudinal direction beyond the winding overhang of at least one wire which follows in the longitudinal direction such that the wire, in the region of the limbs which follows the winding overhang, lies at least in front of the at least one wire which first follows in front of the winding overhang, are each provided on the lower winding overhangs or the upper winding overhangs of the wires.

Therefore, the wires are jumped only in one of the end sides of the stator or rotor, so that the overall height at the respectively other end side of the stator or rotor is not influenced. However, it is also possible for regular jumps, that is to say connecting sections, to be provided on both end sides, that is to say both in the upper and also in the lower winding overhangs.

With preference, in each case in a direction perpendicular in relation to the longitudinal direction and perpendicular in relation to the direction of extent of the limbs, an upwardly directed limb of a wire lies behind a downwardly directed limb of a wire.

The wires are separated, for example, into a first and a second group, wherein the wires of one group are arranged immediately adjacent at least in the region of the limbs and one behind the other in the longitudinal direction of the coil winding, wherein in each case an upwardly directed limb of a wire of a first group lies behind a downwardly directed limb of a wire of the second group.

The groups each have wires which are associated with the different phases of the electric motor. Therefore, there is an even number of wires for each phase, wherein the same number of wires per phase is associated with each group. The limbs of two wires which overlap are each associated with the same phase. This prevents wires of different phases from lying immediately adjacent in a slot and negatively influencing one another.

The wires are preferably subdivided into wire groups, wherein the wires of one wire group are arranged immediately adjacent at least in the region of the limbs and one behind the other in a longitudinal direction of the coil winding, and wherein the winding overhangs of the wire of a wire assembly that is respectively at the rear in the longitudinal direction in a region of a limb protrude transversely in relation to the longitudinal direction beyond the winding overhangs of the other wires of the wire assembly, and the rear wire has, on the winding overhang, a connecting section which is arranged parallel in relation to the longitudinal direction and connects the winding overhang sections, wherein the connecting section is arranged such that the rear wire, in the region of the limbs that follows the winding overhang, lies at least in front of one of the other wires, in particular forms that wire of the wire group which is at the front in the winding direction.

The wires of one wire group preferably have the same phase. Therefore, the order of the wires is changed only within the respective wire group, that is to say within one phase, so that mutual influencing of the wires of different phases is minimized. The change in the order of the wires within one phase leads to a further increase in power of the coil winding or of a stator comprising a coil winding of this kind since, as a result, the production of eddy currents, which would reduce the power, is minimized.

For example, the wire groups each have at least three respective wires, wherein the order of the wires within the wire groups is changed in accordance with a defined, in particular repetitive, pattern.

The number of wires is preferably a multiple of the wire groups and/or of the number of wires of the individual wire groups, so that a repetitive pattern of the wires is produced. The change in the wires is preferably selected such that, even in the case of a plurality of revolutions of the coil winding around the stator or rotor, wires with the same phase, that is to say wires of the same wire group or at least wires with the same phase lie in one slot, so that there is no negative influencing of wires with different phases in a slot. However, in principle, it is not necessary for the same wires to lie in one slot in each case. It suffices for the wires in one slot to have the same phase.

The groups preferably each have at least two wire groups, wherein a corresponding wire group of the second group is in each case associated with each wire group of the first group, wherein in each case an upwardly directed limb of a wire of a wire group of the first group overlaps a downwardly directed limb of a wire of the corresponding wire group of the second group. This arrangement of the wires ensures that wires with the same phase lie in one slot in each case, so that negative influencing of the wires with different phases in a slot can be prevented.

The wires have a connection section at each of the ends, wherein the connection sections preferably project on the side of the upper winding overhangs.

In order to achieve the object, a stator or rotor for an electrical machine is furthermore provided, wherein the stator or the rotor has radially open slots. The rotor or stator has an above-described coil winding, wherein the limbs of the wires are arranged in the slots.

The number of slots preferably corresponds to a multiple of the number of wires of the coil winding, so that a pattern of the wires which is regular in the circumferential direction is produced. As a result, the coil winding can also be wound around the stator or rotor several times given a sufficient length, wherein wires of the same wire group and/or with the same phase lie in one slot, so that negative influencing of the wires with different phases in a slot can be prevented.

The number of sections comprising in each case a downwardly directed limb, a lower winding overhang, an upwardly directed limb and an upper winding overhang for each wire is selected such that at least one downwardly directed limb of a wire and one upwardly directed limb of a second wire are arranged in each slot. Therefore, a uniform distribution of the limbs in the circumferential direction is produced in the slots.

The wires are preferably flat wires, so that they can be inserted into the slots in a space-saving manner.

BRIEF DESCRIPTION OF THE SEVERAL VIEWS OF THE DRAWINGS

Further features, details and advantages of the invention can be gathered from the wording of the claims and also from the following description of exemplary embodiments with reference to the drawings, in which:

FIG. 7 shows an association table for the wires of the coil winding from FIG. 3 with respect to the slots of a stator;

FIG. 8 shows a schematic illustration of a further coil winding according to the invention;

FIG. 9 shows an association table for the wires of the coil winding from FIG. 8 with respect to the slots of a stator;

FIG. 10 shows a schematic illustration of a further coil winding according to the invention;

FIG. 11 shows an association table for the wires of the coil winding from FIG. 10 with respect to the slots of a stator;

FIG. 12 shows a schematic illustration of a further coil winding according to the invention; and FIG. 13 shows an association table for the wires of the coil winding from FIG. 12 with respect to the slots of a stator.

DESCRIPTION OF SPECIFIC EMBODIMENTS OF THE INVENTION

Figure 1:
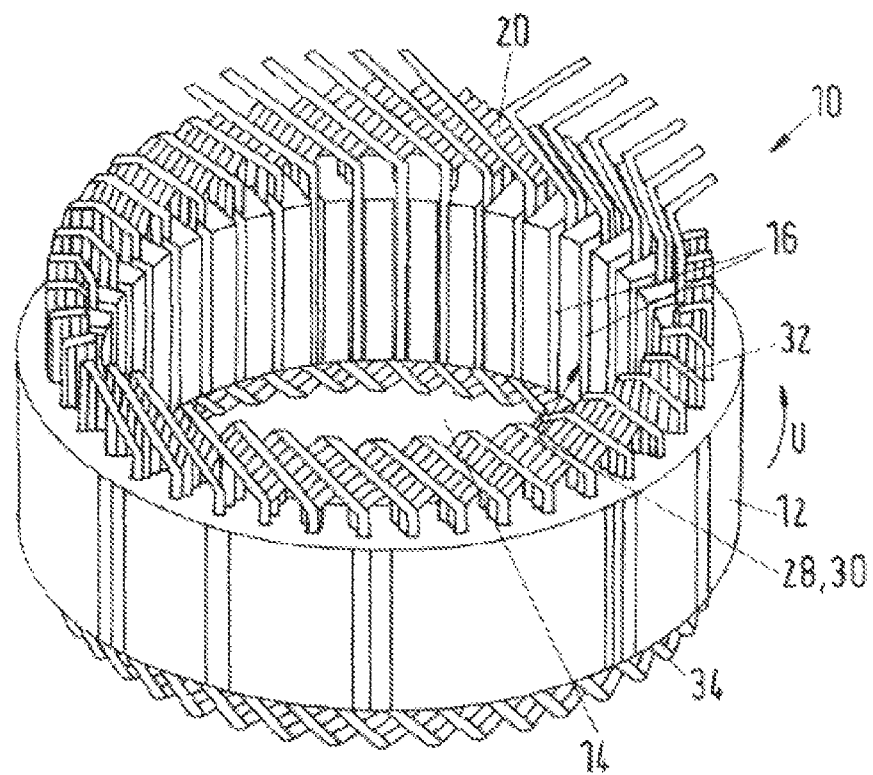
FIG. 1 shows a stator comprising a coil winding from the prior art.

FIG. 1 shows, in general, a stator 10 comprising a coil winding 20. The stator 10 has a main body 12 with a substantially cylindrical accommodation space 14 for a rotor, not shown here. The main body 12 has a plurality of slots 16 which are arranged in a manner distributed uniformly over the circumference of the accommodation space 14 and extend from the accommodation space 14, radially outward, into the main body 12 and extend in the axial direction over the entire length of the stator 10.

Figure 2:
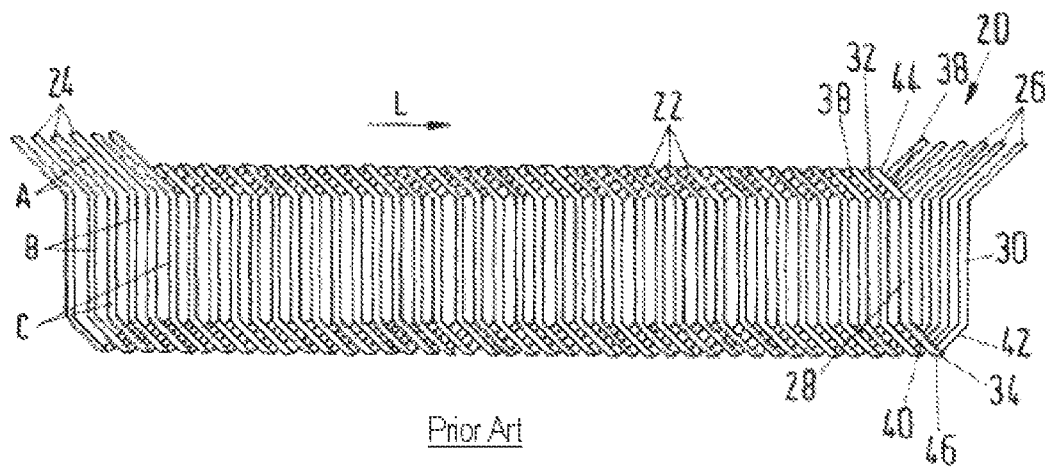
FIG. 2 shows a coil winding from the prior art for the stator from FIG. 1.

The coil winding 20 shown in FIG. 2 has a plurality of wires 22, six wires 22 in the embodiment shown here, which each have a connection section 24, 26 at each end. The wires 22 are each bent several times in opposite directions such that they have limbs 28, 30 which lie parallel in relation to one another and are connected to one another by winding overhangs 32, 34. The limbs 28, 30 are arranged one behind the other in the longitudinal direction L in each case. The winding overhangs 32, 34 each have two obliquely running winding overhang sections 36, 38, 40, 42 with a winding overhang tip 44, 46 lying in between.

The wires are each arranged one behind the other in a longitudinal direction L of the coil winding 20, which corresponds substantially to the circumferential direction U of the stator 10 in the state in which the coil winding 20 is inserted into the stator 10, at least in the region of the limbs 28, 30. Three phases A, B, C are preferably associated with the wires. Therefore, two wires 22 are associated with each phase A, B, C. The number of wires 22 is selected such that in each case an upwardly directed limb 28 of a wire 22 overlaps a downwardly directed limb 30 of a further wire 22 in a direction perpendicular in relation to the direction of extent of the limbs 28, 30 and perpendicular in relation to the longitudinal direction L. In the embodiment shown here, the first three and the last three wires 22 overlap in each case. Wires 22 with the same phase A, B, C preferably overlap in the region of the limbs 28, 30 in each case.

As can be seen in FIG. 1, the limbs 28 are inserted into the slots 16, wherein the winding overhangs 32, 34 protrude beyond the slots 16, that is to say beyond the stator 10, in the axial direction. Since an upwardly directed limb 28 of a wire 22 overlaps a downwardly directed limb 30 of another wire 22 in each case, at least two limbs 28, 30, specifically an upwardly directed limb 28 of a first wire 22 and a downwardly directed limb 30 of a second wire 22, are arranged in each slot 16. The same number of wires 22 is arranged in each slot 16, so that a uniform distribution of the wires 22 in the circumferential direction U is produced in the slots 16.

Given a sufficient length of the coil winding 20, the coil winding 20 can also be inserted into the stator 10 by way of a plurality of windings. However, irrespective of the number of windings, the length of the coil winding is selected such that the same number of upwardly directed limbs 28 and downwardly directed limbs 30 is arranged in each slot 16.

The number of wires 22 and the number of phases A, B, C can be changed as desired just like the number of slots 16, wherein it is merely necessary to ensure a uniform distribution of the slots 16 and of the wires 22 of the individual phases A, B, C in the circumferential direction.

In principle, it is known to swap the position of individual wires 22 in subregions of the coil winding 20, wherein the wires 22 each jump over other wires 22 in the region of a winding overhang 28, 30.

This jumping-over is achieved, for example, by way of the winding overhang sections 36, 38, 40, 42 of the wire 22 being designed to be longer, so that the distance of the limbs 28, 30, which are connected by the respective winding overhang 32, 34, increases, in particular by the magnitude of the distance of the slots 16. At the same time, the winding overhang sections 36, 38, 40, 42 of the wire 22 which is to be jumped over are designed to be shorter, so that the distance the distance of the limbs 28, 30, which are connected by the respective winding overhang 32, 34, is shortened, in particular by the magnitude of the distance of the slots 16.

If it is desired for a wire 22 to jump over a plurality of wires 22, corresponding extension of the respective winding overhang 32, 34 is required, as a result of which the overall height of the stator in the axial direction would increase.

Figure 3:
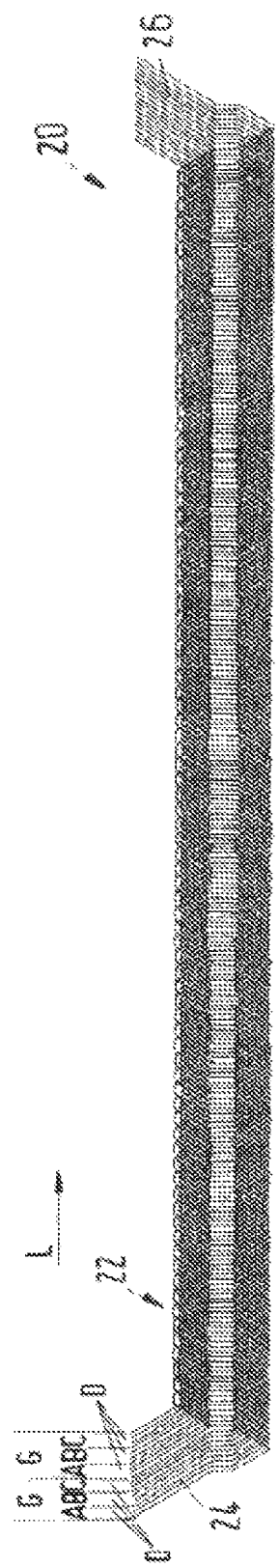
FIG. 3 shows a schematic illustration of one embodiment of a coil winding according to the invention.

FIG. 3 shows a coil winding 20 which allows the order of the wires to be swapped in any desired manner, wherein the overall height of the stator 10 is largely independent of the number of wires 22 which are to be jumped over in each case.

In the present embodiment, the coil winding 20 has a number of 18 wires 22 and is designed for a stator 10 comprising 90 slots and 10 poles.

A total of three different phases A, B, C are associated with the wires 22. As will be explained in detail below, the coil winding 20 is designed such that the stator 10 has a total of three windings in the circumferential direction U, that is to say a total of six limbs 28, 30 of the wires 22 lie in each slot 16.

It is self-evident that the fundamental idea can also be applied to coil windings 20 or stators 10 with a different number of wires 22 and slots 16. The number of windings and phases A, B, C can also be changed as desired under the terms of the boundary conditions explained below.

In principle, the wires 22 are subdivided into two groups G with in each case 9 wires, wherein each group G has three wire groups D with in each case three wires 22. The wires 22 of a group D are each associated with the same phase A, B, C, wherein each group G has in each case one wire group D which is associated with one of the three phases A, B, C. Therefore, six wire groups D with in each case three wires 22, which are associated with the three phases A, B, C, are produced.

In the text which follows, the wires 22 of the first phase are also denoted A1 to A6, the wires 22 of the second phase are also denoted B1 to B6 and the wires 22 of the third phase are also denoted C1 to C6. The wires A1 to A3, B1 to B3 and C1 to C3 belong to the first group G. The wires A4 to A6, B4 to B6 and C4 to C6 belong to the second group G.

The wires 22 of a wire group D are in each case arranged adjacent in the longitudinal direction L, wherein the wires 22 are arranged one behind the other at least in the region of the limbs 28, 30. The wire groups D of a group G are in each case arranged one behind the other, wherein the order of the wire groups D in relation to one another does not change. The wire groups D of the second group G directly follow the first group G in the longitudinal direction, wherein the order of the wire groups D within the second group G corresponds to the order of the wire groups D of the first group G.

In principle, the distance of the wires 22 and the length of the winding overhang sections 36, 38, 40, 42 are selected such that the downwardly directed limbs 30 of the wire group D of the first group each overlap the upwardly directed limbs 28 of the wire group D of the second group, which has the same phase A, B, C, in a direction transverse in relation to the longitudinal direction L and transverse in relation to the direction of extent of the limbs 28, 30. Therefore, limbs 28, 30 or wires 22 which have the same phase A, B, C, always overlap.

Figure 7:
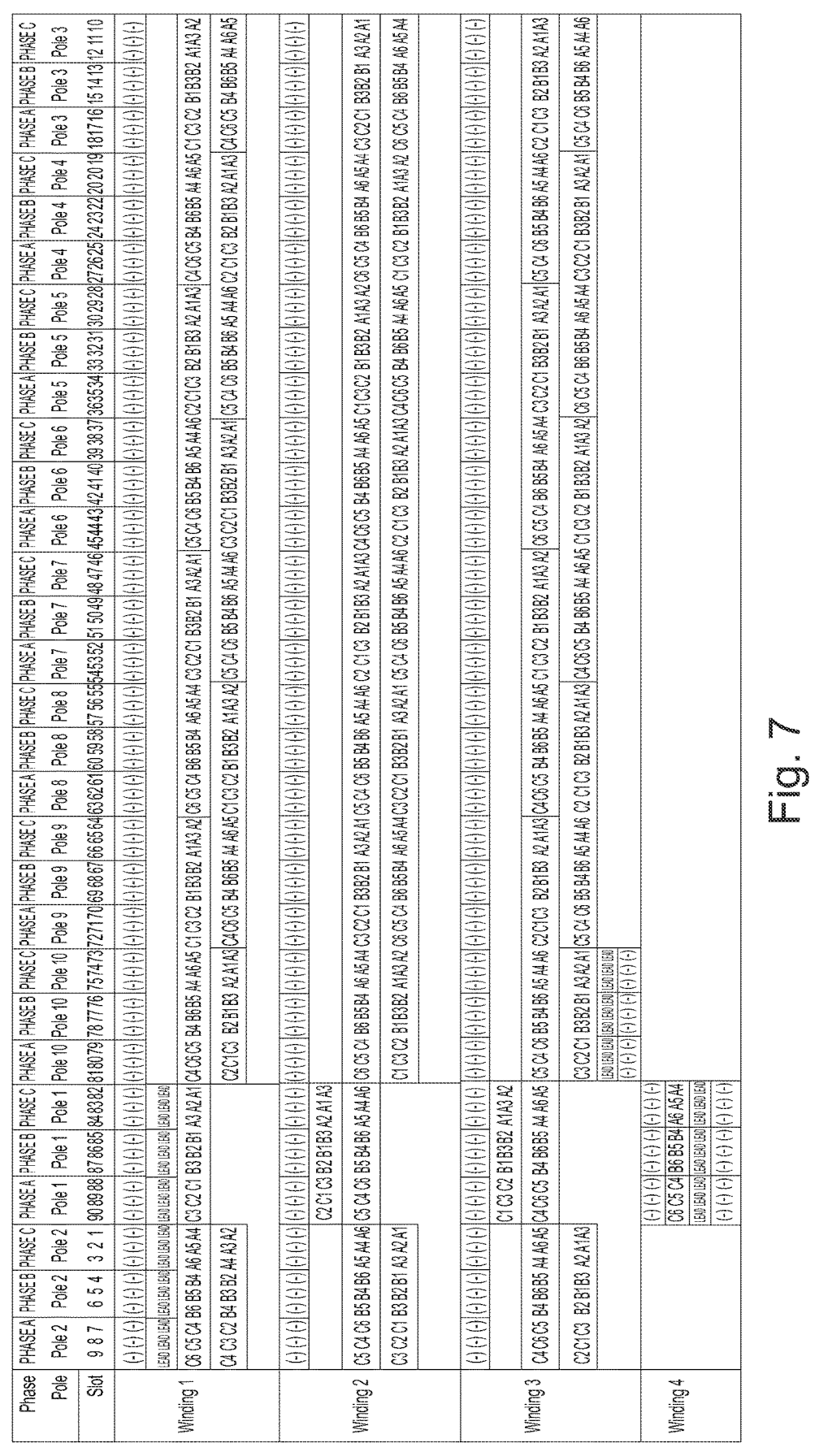

In each case nine downwardly directed limbs 30 of a group G and the nine overlapping upwardly directed limbs 28 of the other group G together form, inserted in the slots 16, a pole of the stator 10 (also see FIG. 7), so that a total of 10 poles are produced when there are 90 slots.

Since the number of slots is a multiple of the number of wires 22 or a multiple of the number of wires 22 of a group G, there are in each case only wires 22 of one phase A, B, C in a slot 16 even in the case of a plurality of windings of the coil winding 20 around the stator 10, so that negative influencing by wires 22 with different phases A, B, C in a slot 16 is prevented.

In the embodiment shown here, the length of the coil winding 20 is selected such that it is inserted into the stator 10 or into the slots 16 of the stator 10 by way of three complete windings. Therefore, there are six wires 22, each with the same phase A, B, C, in each slot.

The profile of the individual wires 22 will be explained below in FIGS. 4 to 6 with reference to the wires A1, A2, A3. The wires A4 to A6, B1 to B6 and C1 to C6 each have an analogous profile.

The order of the wires A1, A2, A3 in the upper winding overhangs 32 changes within the wire group D, so that the order of the wires A1, A2, A3 in the longitudinal direction L in each case varies in regions of the upwardly directed limbs 28 that follow one another in the longitudinal direction L. To this end, that wire A1, A2, A3 which is respectively at the rear in the longitudinal direction L in the region of the upwardly directed limbs 28 is arranged in the upper winding overhang such that it lies in front of the two other wires A1, A2, A3 of the respective wire group D in the longitudinal direction in the following region of the downwardly directed limbs 30.

This pattern is repeated in each section 50 of a wire group D consisting of upwardly directed limbs 28, upper winding overhangs 32, downwardly directed limbs 30 and lower winding overhangs 34, so that the order of the wires 22 in the region of the limbs 28, 30 within a wire group D repeatedly changes over the entire length of the coil winding 20. Therefore, the repetitive order A1-A2-A3, A2-A3-A1, A3-A1-A2 is produced in successive sections 50 for the wire group D consisting of wires A1, A2, A3.

In a conventional coil winding 20 with 18 wires 22, a wire 22 would lie in every ninth slot. In the embodiment shown here, the wire 22 which is at the rear in the longitudinal direction L jumps over in each case two further slots 16, that is to say jumps to the eleventh slot 16 starting from the last slot 16, while the two jumped-over wires 22 of this wire group D each jump over one slot 16 less, that is to say jump to the respectively eighth slot 16. Since the wires 22 of a wire group D in each case alternately execute the above-mentioned jumps, these are balanced out again after three sections of the wires, so that the wires 22 of a group D always lie immediately adjacent in the longitudinal direction L and the order of the wire groups D in relation to one another does not change.

Therefore, in the case of a wire group D with three wires A1, A2, A3, the order of the wires A1, A2, A3 in the region of the limbs 28, 30 is repeated after in each case three sections or after six poles. Since the stator 10 has a total of 10 poles, the second and the third winding each begin with a different order of the wires 22 in the individual sections, so that each wire 22 of a phase A, B, C lies in each slot 16 only once, but wherein always only wires of one phase A, B, C lie in a slot 16. The distribution of the wires 22 in the individual slots can be gathered from FIG. 7.

The described distribution leads to improved performance of the stator 10 since negative influences of the wires 22 with different phases A, B, C, for example due to eddy currents, are prevented.

Figure 4:
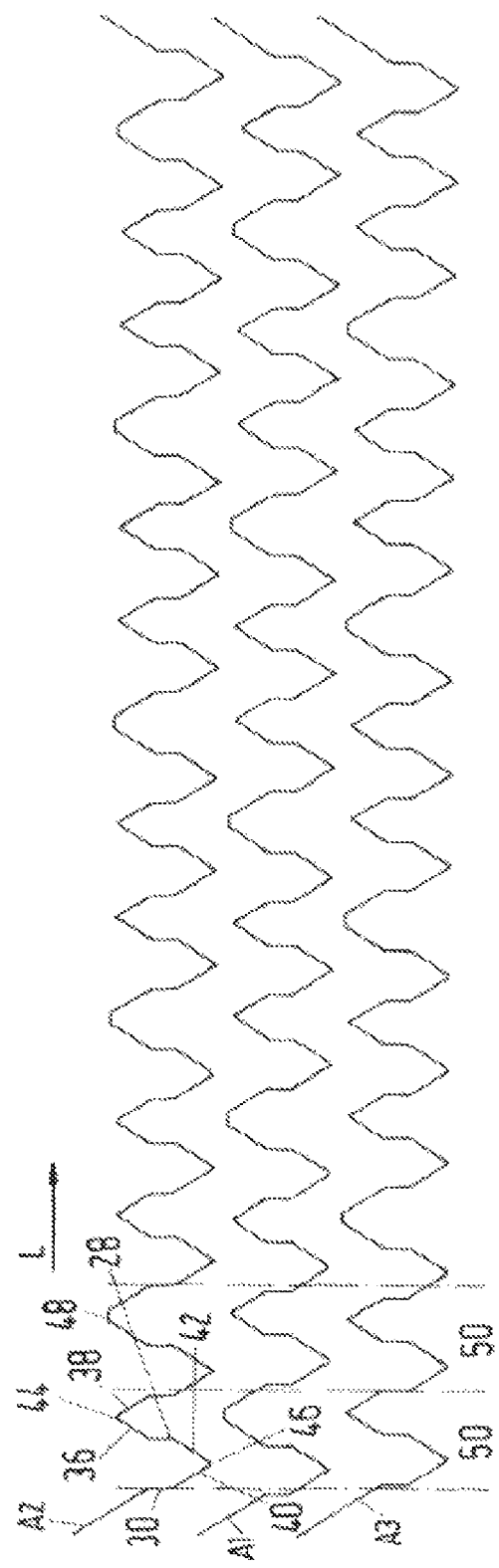
FIG. 4 shows an illustration of the wires of one wire group of the coil winding from FIG. 3.
Figure 5:
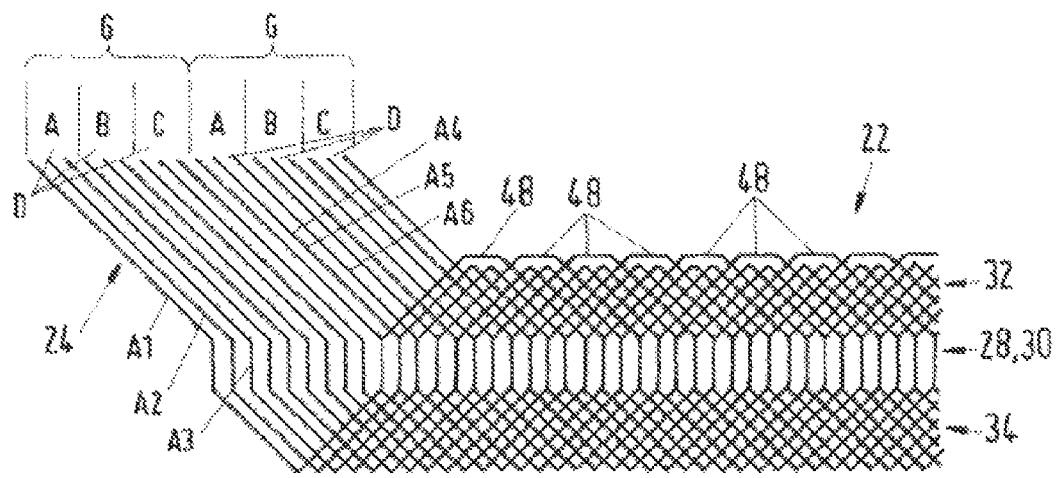
FIG. 5 shows a view of a detail of the coil winding from FIG. 3.
Figure 6:
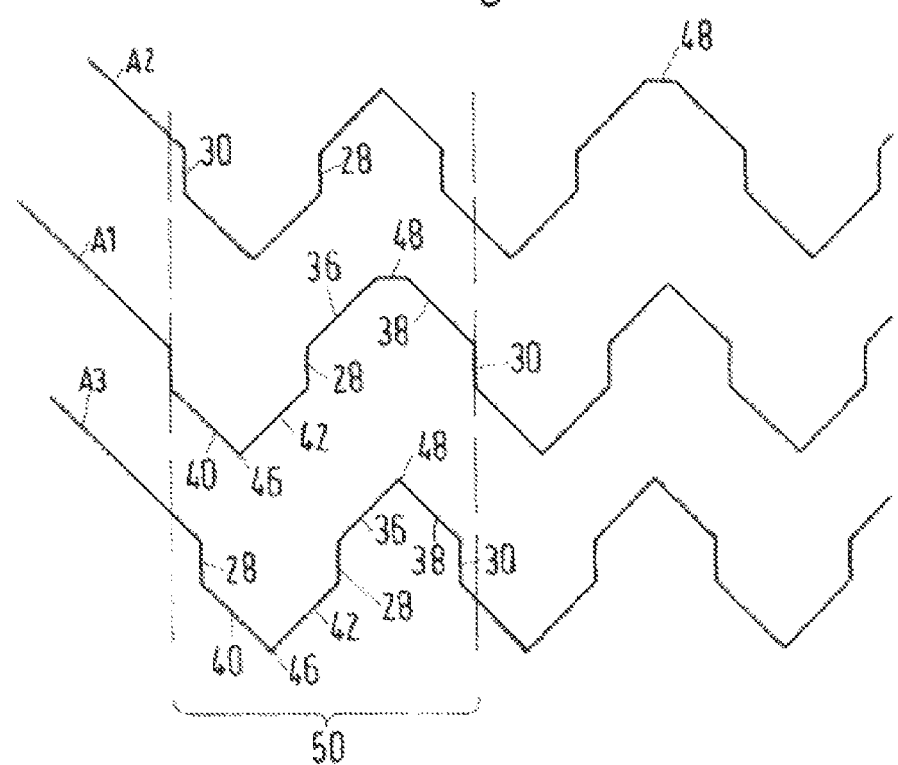
FIG. 6 shows a view of a detail of the wires from FIG. 4 in the region of the view of a detail from FIG. 5.

In order to reduce the overall height of the stator 10, the upper winding overhang 32 of the wire 22, which jumps over the respectively other two wires 22 of a wire group D, in each case has a different geometry, which is shown in detail in FIGS. 4 and 6. A connecting section 48 which extends substantially in the longitudinal direction L or runs parallel in relation to the longitudinal direction L in the embodiment shown here is in each case additionally provided between the winding overhang sections 36, 38. The adjoining winding overhang sections 36, 38 are slightly extended, so that the connecting section 48 protrudes beyond the winding overhang tips 44 of the winding overhangs 32 beneath it in the axial direction, that is to say transversely in relation to the longitudinal direction L. In this case, the length of the connecting section 48 in the longitudinal direction L is selected such that the distance of the limbs 28, 30, which the winding overhang 32 connects, is increased in size by twice the distance between two slots 16 between two adjacent limbs 28, 30, so that the two other wires 22 of this wire group are jumped over by the connecting section 48.

As an alternative, the connecting sections 48 can also be bent, wherein the connecting sections 48 extend substantially in the longitudinal direction L.

As can be seen in FIGS. 4 and 6, the connecting sections 48 each lie in a plane which runs parallel in relation to the longitudinal axis L. The winding overhang tips 44 of the winding overhangs 32, which are jumped over, lie in a plane which is at a distance from the plane of the connecting sections 48, wherein the distance of the plane of the connecting sections 48 from the limbs 28, 30 is greater than the distance of the plane of the winding overhang tips 44 from the limbs 28, 30. Therefore, the winding overhang tips 44 of the upper winding overhangs 32 are located in two parallel planes.

The design of the winding overhangs 32 with a flattened connecting section 48 renders possible, in principle, any desired change in the order of the wires 22 within a wire group D, wherein the overall height of the stator 10 is independent of the number of jumped-over wires 22. It is merely necessary to ensure that the connecting sections 48 do not make contact with one another or intersect.

In principle, the number of wires 22 in each wire group D and the number of wires 22 in each group G can be changed in any desired manner. In particular, individual wire groups are not necessary. If wire groups D with different phases are provided, both groups G preferably have the same number of wire groups G and the same number of wires per wire group D. In order to avoid negative influences of the wires 22 with different phases A, B, C, only wires 22 with the same phase A, B, C are preferably inserted into a slot 16 in each case.

In principle, the change in the order of the wires 22 within a wire group D or within a group G is repeated over the entire length of the coil winding 20, so that a repetitive pattern in the order of the wires 22 is produced. This pattern is preferably selected such that only wires with the same phase A, B, C lie in a slot 16 in the stator in each case, wherein ever-changing wires 22 preferably lie in a slot 16.

FIGS. 3 to 7 illustrate a coil winding 2 for a stator comprising 90 slots, wherein the stator has three phases A, B, C and in each case three wires 22 per phase A, B, C. Therefore, a total of 10 poles or 5 pole pairs are produced per winding in the circumferential direction. In this case, a pole pair corresponds to a section beginning from an upwardly directed limb 28 of a wire 22 to the upwardly directed limb 28 of the wire 22 that follows in the circumferential direction.

When there are a total of three windings of the coil winding 2, six wires lie in each slot 16. Since the number of slots are a multiple of the wire groups D, the number of polar pairs and the number of wires 22 per phase A, B, C, the wires 22 in a slot 16 each have the same phase A, b, C (see, in particular, FIG. 7).

The basic idea of the invention can also be applied to stators 10 or rotors with a different number of phases A, B, C of a different number of wires 22 per phase or a different number of slots 16, provided that the above-described principles are followed.

A further example is explained in FIGS. 8 and 9. As can be seen in FIG. 8, the coil winding 2 likewise has two wire groups D with in each case three phases A, B, C and in each case three wires 3. However, in a departure from the exemplary embodiment according to FIGS. 3 to 7, the winding is provided for a stator comprising 54 slots 16.

In FIG. 8, and also in the following examples, the numbers 1 to 54 in the regions of the upwardly directed or downwardly directed limbs 28, 30 denote the consecutively numbered slots into which the limbs 28, 20 are inserted, said limbs in each case being located to the right of the number with respect to FIG. 8.

For reasons of clarity, only the wires A1, A2, A3, A4, A5, A6 of the phase A are illustrated. However, the following explanations analogously apply to the wires 22 of the phases B and C too.

In this exemplary embodiment, the number of slots 16 is also a multiple of the number of wire groups D, the number of pole pairs and the number of wires 22 per phase A, B, C, so that only wires of one phase A, B, C lie in a slot in each case. With respect to the wires 22 of the phase A, the distribution in the slots is illustrated in FIG. 9, wherein only one winding is illustrated. "A" in each case denotes the lower position within the slot 16, and "B" denotes the position of a wire 22 above it.

U1, U2, U3, U4, U5, U6 and, respectively, E1, E2, E3, E4, E5, E6 each illustrate the electrical connections of the wires A1, A2, A3, A4, A5, A6.

As can be seen in FIG. 8, in this embodiment too, the wire 22, which is in each case last in the longitudinal direction L, of a phase A, B, C jumps over the wires 22, which is respectively situated in front of said last wire in the longitudinal direction L, of the phase A, B, C in the upper winding overhangs 32, so that the wire 22 in the following region of the downwardly directed limbs 30 lies in front of these two wires 22.

Individual wires are not jumped over in the lower winding overhangs 34. Therefore, this embodiment substantially corresponds to the embodiment shown in FIGS. 3 to 7, wherein only the number of slots 16 and windings differs.

The exemplary embodiment illustrated in FIGS. 10 and 11 is intended for use in a stator comprising 48 slots 16. This winding also has three phases A, B, C, wherein the phase A, B, C of each wire group D each have only two wires 22 here. Therefore, only a total of 12 wires are provided, whereas in each case 18 wires 22 are provided in the preceding exemplary embodiments. Therefore, eight poles or four polar pairs are produced.

The electrical connections of the phase A or the wires A1, A2, A3, A4 are denoted U1, U2, U3, U4 and, respectively, E1, E2, E3, E4, analogously to FIGS. 8 and 9.

In a departure from the preceding exemplary embodiment, the wires of one phase jump over each other both in the upper winding overhangs 32 and also in the lower winding overhangs 34. Therefore, the order of the wires 22 of a phase A within a wire group D within the upwardly directed limbs 28 and, respectively, the downwardly directed limbs 30 is the same in each case. The wire A2 is respectively located in front of the wire A1 in the longitudinal direction L in the upwardly directed limbs 28, and the wire A1 is respectively located in front of the wire A2 in the downwardly directed limbs 30.

The distribution of the wires 22 of the phase A in the slots 16 is illustrated in FIG. 11.

The coil winding 2 illustrated in FIGS. 12 and 13 is likewise provided for a stator comprising 48 slots 16. In a departure from the exemplary embodiment illustrated in FIGS. 10 and 11, the three phases A, B, C of each wire group D each have four wires 22. Therefore, a total of 24 wires are provided and four poles or two pole pairs are produced.

The electrical connections of the phase A or of the wires A1, A2, A3, A4, A5, A6, A7, A8 are denoted U1, U2, U3, U4, U5, U6, U7, U8 and, respectively, E1, E2, E3, E4, E5, E6, E7, E8.

As can be seen in FIG. 12, a first wire 22 which is at the rear in the longitudinal direction L in a region of the upwardly directed limbs 28 jump over the second wire 22 which is arranged immediately in front of said first wire in the longitudinal direction in this region. Furthermore, the wire 22 which is third in the longitudinal direction L in this region jumps over the fourth wire 22 which is at the front in this region. Therefore, given an order in the region of the upwardly directed limbs 28 of A1-A2-A3-A4, the order A2-A1-A4-A3 is produced in that region of the downwardly directed limbs 30 which is adjacent in the longitudinal direction L.

Analogously to the preceding exemplary embodiment, this change also takes place in the upper and the lower winding overhangs 32, 34 in the same way in each case. The change takes place in each case only between the wires A1 and A2 and, respectively, A3 and A4. Analogously to the preceding example, the order of the wires A1, A2, A3, A4 in the regions of the upwardly directed limbs 28 is therefore the same in each case, specifically A1-A2-A3-A4, while the order of the wires A1 and A2 and, respectively, A3 and A4 is swapped in the regions of the downwardly directed limbs 30 in each case.

In a departure from the exemplary embodiments shown, different variations of the number of wires 22, the number of slots 16, the number of phases A, B, C and the number of wires 22 per phase A, B, C are possible. Similarly, a wire 22 of a phase A, B, C of a wire group D can jump over any desired number of wires of the same phase A, B, C of the wire group D which lie in front of said wire in the longitudinal direction L in a region of upwardly directed or downwardly directed limbs 28, 30. It is simply necessary to ensure that only wires 22 of the same phase A, B, C are jumped over in each case within the wire group D, that is to say only the order of the wires 22 within the phase A, B, C of a wire group D changes.

The order of the wires 22 preferably changes in such a way that only wires of one phase A, B, C are located in a slot in each case.

All of the features and advantages revealed in the claims, the description and the drawing, including structural details, physical arrangements and method steps, can be essential to the invention both on their own and in an extremely wide variety of combinations.

LIST OF REFERENCE SYMBOLS

10 Stator
12 Main body
12 Main body
12 Main body
14 Accommodation space
16 Slot
20 Coil winding
22 Wire
24 Connection section
26 Connection section
28 Upwardly directed limb
30 Downwardly directed limb
32 Upper winding overhang
34 Lower winding overhang
36 Winding overhang section
38 Winding overhang section
40 Winding overhang section
42 Winding overhang section
44 Upper winding overhang tip
46 Lower winding overhang tip
48 Connecting section
50 Section
A, B, C Phases
A1, A2, A3 Wires of a wire group
A4, A5, A6 Wires of a wire group
B1, B2, B3 Wires of a wire group
B4, B5, B6 Wires of a wire group
C1, C2, C3 Wires of a wire group
C4, C5, C6 Wires of a wire group
D Wire groups
G Groups of wires
L Longitudinal direction
U Circumferential direction

The invention claimed is:

1. A coil winding configured for insertion into radially open slots (16) of a stator (10) or a rotor of an electrical machine,
wherein the coil winding (20) consists of a plurality of wires (22) which are braided with one another, each of the plurality of wires (22) is bent several times in opposite directions such that limbs (28, 30) of each of the plurality of wires (22) lie parallel in relation to other of the plurality of wires (22), the plurality of wires (22) are intended to fill the slots (16) and are connected by winding overhangs (32, 34) which project beyond the end sides of the stator (10) or rotor,
wherein the winding overhangs (32, 34) each have two obliquely running winding overhangs sections (36, 38, 40, 42) with a winding overhang tip (44, 46) lying in between, wherein the plurality of wires (22) are arranged one behind the other in a longitudinal direction (L) of the coil winding (20), wherein the plurality of wires (22) are split into a first and a second group (G), wherein the plurality of wires (22) of one group (G) are associated to the different phases of an electric motor and for each phase an even number of wires is provided, wherein the same number of wires per phase is associated with each group, wherein members of one group (G) are arranged immediately adjacent at least in the region of the limbs (28, 30) and one behind the other in the longitudinal direction (L) of the coil winding (20), wherein an upwardly directed limb (28) of the members of the first group (G) overlaps a downwardly directed limb (30) of a member of the second group (G), the groups (G) each have at least two wire groups (D), each wire group (D) having at least two of the plurality of wires (22), wherein a corresponding wire group (D) of the second group (G) is associated with each wire group (D) of the first group (G), wherein an upwardly directed limb (28) of a member of the wire group (D) of the first group (G) overlaps a downwardly directed limb (30) of a member of the corresponding wire group (D) of the second group (G), the wires of one wire group (D) having the same phase (A, B, C) and in a manner distributed over the entire length of the coil winding in the longitudinal direction (L), winding overhangs (32, 34) of at least one first wire of one wire group (D) protrudes in relation to the longitudinal direction (L) beyond the winding overhang (28, 30) of at least one second wire of said wire group (D) along the longitudinal direction (L), wherein for a subset of the plurality of wires (22) the order thereof is only changed within the respective wire group (D) hence only within one phase (A, B, C), so that the mutual eddy currents induction of wires belonging to different phases (A, B, C) on each other is reduced.

2. The coil winding as claimed in claim 1, wherein a circumferential direction of the stator (L), a first winding overhang (32, 34) of the at least one first wire protrudes axially beyond a second winding overhang (32, 34) of the at least one second wire, the at least one first and the at least one second wires are disposed next to each other in the circumferential direction (L) in a region of the limbs (28, 30).

3. The coil winding as claimed in claim 2, wherein the winding overhangs (32, 34) are arranged in a manner distributed uniformly along a wire and/or along the coil winding.

4. The coil winding as claimed in claim 2, wherein the winding overhangs (32, 34) have a connecting section (48) which extends substantially in the longitudinal direction (L) and/or is arranged parallel in relation to the longitudinal direction (L), wherein connecting sections (48) lie in a plane which is arranged parallel in relation to the longitudinal direction (L).

5. The coil winding as claimed in claim 4, wherein each of the plurality of wires (22) has a plurality of sections (50) each comprising a downwardly directed limb (30), a lower winding overhang (34), an upwardly directed limb (28) and an upper winding overhang (32), and in that the winding overhang tips (44, 46) of the winding overhangs (32, 34), which protrude transversely in relation to the longitudinal direction (L) beyond the winding overhang (28, 30) of at least one second wire (20) are each provided on the lower winding overhangs (34) or the upper winding overhangs (32) of the at least one first wire and the at least one second wire.

6. The coil winding as claimed in claim 2, wherein the winding overhang tips (44, 46) of the winding overhangs (32, 34) lie in a plane which is arranged parallel in relation to the longitudinal direction (L).

7. The coil winding as claimed in claim 6, wherein each of the plurality of wires (22) has a plurality of sections (50) each comprising a downwardly directed limb (30), a lower winding overhang (34), an upwardly directed limb (28) and an upper winding overhang (32), and in that the winding overhang tips (44, 46) of the winding overhangs (32, 34), which protrude transversely in relation to the longitudinal direction (L) beyond the winding overhang (28, 30) of at least one first wire (20) are each provided on the lower winding overhangs (34) or the upper winding overhangs (32) of the plurality of wires (22).

8. The coil winding as claimed in claim 2, wherein the winding overhangs (32, 34), which protrude transversely in relation to the longitudinal direction (L) beyond the winding overhang (28, 30) of at least one first wire are arranged in a manner distributed uniformly along a wire and/or along the coil winding.

9. The coil winding as claimed in claim 2, wherein the winding overhangs (32, 34), which protrude transversely in relation to the longitudinal direction (L) beyond the winding overhang (28, 30) of at least one first wire (20) have a connecting section (48) which extends substantially in the longitudinal direction (L) and/or is arranged parallel to the longitudinal direction (L), wherein connecting sections (48) lie in a plane which is parallel to the longitudinal direction (L).

10. The coil winding as claimed in claim 1, wherein the plurality of wires (22) are subdivided into wire groups (D), wherein the members of one of the wire groups (D) are arranged immediately adjacent at least in the region of the limbs (28, 30) and one behind the other in a longitudinal direction (L) of the coil winding, and in that the winding overhangs (32, 34) of a member of the wire group (D) that is respectively at the rear in the longitudinal direction (L) in a region of a limb (28, 30) protrude transversely in relation to the longitudinal direction (L) beyond the winding overhangs (32, 34) of the at least one second wire of the wire assembly (D), and in that the at least one first wire has a connecting section (48) which is arranged parallel in relation to the longitudinal direction (L) and connects the winding overhang sections (36, 38, 40, 42), wherein the connecting section (48) lie in a plane which is arranged parallel to the longitudinal direction (L).

11. The coil winding as claimed in claim 1, wherein the plurality of wires (22) is a multiple of the wire groups (D) and/or of the plurality of wires (22) of the individual wire groups (D).

12. The coil winding as claimed in claim 1, wherein in an end of each of the plurality of wires (22) has a connection section (24, 26) that projects on a side of a respective upper winding overhang (32).

13. The coil winding as claimed in claim 1, wherein the limbs (28, 30) of the plurality of wires (22) are arranged in radially open slots (16).

14. The stator or rotor as claimed in claim 13, wherein the number of slots (16) corresponds to a multiple of the plurality of wires (22) of the coil winding (20).

15. The stator as claimed in claim 14, wherein each of the plurality of wires (22) comprises a downwardly directed limb (30), a lower winding overhang (34), an upwardly directed limb (28) and an upper winding overhang (32), wherein at least one downwardly directed limb (30) of one of the plurality of wires (22) and one upwardly directed limb (28) of another of the plurality of wires (22) are arranged in each slot (16).

16. The stator as claimed in claim 13, wherein each of the plurality of wires (22) comprises a downwardly directed limb (30), a lower winding overhang (34), an upwardly directed limb (28) and an upper winding overhang (32); wherein at least one downwardly directed limb (30) of a first wire of the plurality of wires (22) and one upwardly directed limb (28) of a second wire of the plurality of wires (22) are arranged in each slot (16).

\* \* \* \* \*